United States Patent [19]

Nishimiya et al.

[11] 4,314,585
[45] Feb. 9, 1982

[54] PROPORTIONAL TYPE ELECTROMAGNETIC VALVE

[75] Inventors: Torazo Nishimiya, Mito; Masamitsu Okumura; Seisaku Numakura, both of Katsuta, all of Japan

[73] Assignee: Hitachi, Ltd., Tokyo, Japan

[21] Appl. No.: 68,577

[22] Filed: Aug. 22, 1979

[30] Foreign Application Priority Data

Aug. 23, 1978 [JP] Japan .................. 53/103315

[51] Int. Cl.³ .................. F16K 31/06; F16K 1/44
[52] U.S. Cl. .................. 137/625.34; 251/129; 251/282
[58] Field of Search .................. 251/282, 129, 141; 137/625.34, 625.36, 625.65

[56] References Cited

U.S. PATENT DOCUMENTS

| | | | |
|---|---|---|---|
| 2,436,992 | 3/1948 | Ernst | 137/625.65 X |
| 2,934,090 | 4/1960 | Kenann et al. | 251/129 X |
| 3,069,846 | 12/1962 | Buescher | 137/625.34 X |
| 3,123,091 | 3/1964 | Elsey | 137/625.34 X |
| 3,368,791 | 2/1968 | Wells | 251/129 |
| 3,530,888 | 9/1970 | Cable | 251/282 X |
| 3,858,135 | 12/1974 | Gray | 137/625.65 X |

*Primary Examiner*—Arnold Rosenthal
*Attorney, Agent, or Firm*—Craig and Antonelli

[57] ABSTRACT

A proportional type electromagnetic valve comprises a flow rate control valve secured to a movable core which moves a stroke in proportion to the input current, and a valve seat portion cooperative with the flow rate control valve to control the flow rate. In addition to a bias spring providing for urging the flow rate control valve toward the valve seat portion, a second spring is disposed on the movable core for urging the flow rate control valve to release it from the valve seat portion. The resultant force of the two springs makes the stroke of the flow rate control valve proportional to the input current.

6 Claims, 4 Drawing Figures

PROPORTIONAL TYPE ELECTROMAGNETIC VALVE

BACKGROUND AND SUMMARY OF THE INVENTION

This invention relates to a proportional type electromagnetic valve which is provided in an air-fuel mixture supply device adapted to supply fuel and air to an internal combustion engine and which controls the amount of fuel or air.

Generally, this type of electromagnetic valve is required to be able to control the flow rate in substantially proportional relationship to the input current.

A conventional proportional type electromagnetic valve has integrally formed electromagnetic driving section and flow rate control valve, and a bias spring for urging the flow rate control valve. The bias spring urges the flow rate control valve to cope with electromagnetic force which acts on the control valve when the electromagnetic driving section is fed with an electric current, so that the stroke of the control valve is determined depending on the balance between the bias spring force and the electromagnetic force.

As described above, in the proportional type electromagnetic valve it is required that the flow rate be controllable over a wide range in proportion to the electric current fed to the electromagnetic driving section.

The proportional type electromagnetic valve of the prior art was, however, difficult to achieve such a characteristic as above. More particularly, when a coil of the electromagnetic driving section is fed with a current, electromagnetic force proportional to the current acts on the control valve and the stroke of the valve is determined corresponding to a position at which the electromagnetic force and the force of the bias spring are balanced. Actually, however, such factors as nonlinearity of the electromagnetic force, frictional resistance of a movable portion, and non-lineality of the bias spring force degrade the proportional relation between the current and the stroke.

This requires a suitable selection of the spring constant of the bias spring. If the bias spring is soft and has a small spring constant, the controlled flow rate, on one hand, will rapidly be increased and saturated within a range of a small current and the flow rate control valve, on the other hand, cannot fully close even when the current is rendered off. Moreover, an increase in the width of hysteresis is accompanied by variations of the current. Conversely, if the bias spring is stiff and has a large spring constant, the set load (a load with which the spring begins to deform) will inevitably increase. Consequently, it is not before the current reaches a relatively large predetermined value that the flow rate control valve begins to operate, and even with an increased current the movement of the flow rate control valve is suppressed to be small.

Under these conditions, if the current fed to the coil is excessively increased so as to extend the movement of the flow rate control valve for its full open, the power transistor of a driving circuit will be overheated.

As will be seen from the above, it is impossible to properly control the movement of the flow rate control valve with a single bias spring.

An object of the present invention is to provide a proportional type electromagnetic valve being suitable for producing the flow rate which is in exact proportion to the amount of input current. In the proportional type electromagnetic valve according to the invention, there is provided, in addition to a bias spring, a second spring which urges a flow rate control valve in the opposite direction to the bias spring to open the flow rate control valve, whereby the flow rate can be controlled in exact proportion to the amount of the current fed to an electromagnetic driving section.

BRIEF DESCRIPTION OF THE DRAWINGS

The invention will be further described with reference to accompanying drawings in which.

DETAILED DESCRIPTION OF THE DRAWINGS

Figure 1:
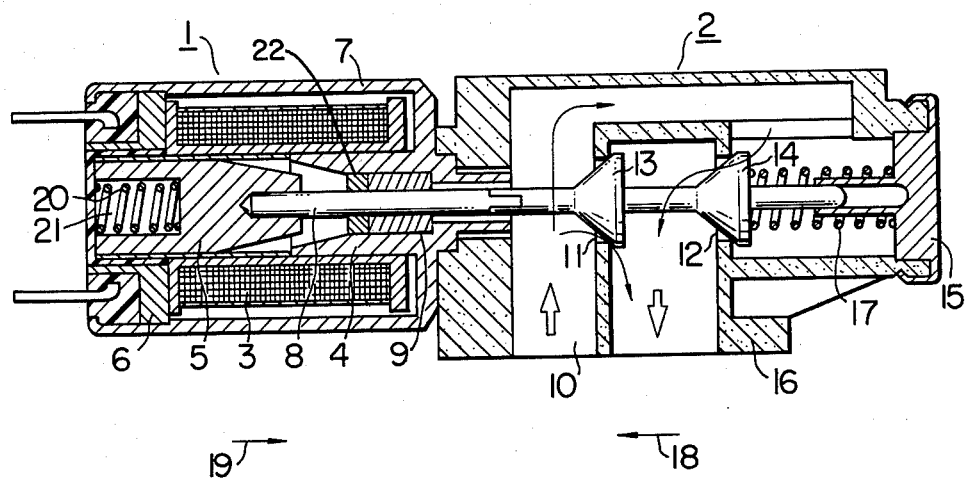
FIG. 1 is a longitudinal sectional view of a proportional type electromagnetic valve embodying the invention.

Referring now to FIG. 1, there is shown a preferred embodiment of a proportional type electromagnetic valve according to the invention comprising, as principal components, an electromagnetic driving section 1 and a flow rate control section 2. The electromagnetic driving section 1 includes a cylindrical coil 3, a stationary core 4, and a movable core 5. The stationary and movable cores 4 and 5 are aligned on the center line of the coil 3 and have their opposing end portions with mutually parallel conical surfaces. An end plate 6 and a casing 7 establish a magnetic circuit and the end plate 6 has a construction which permits such a correction as to make constant the total permeance of the magnetic circuit in accordance with the amount of stroke of the movable core 5. Secured to the center of the movable core 5 is an output shaft 8 for transmission of a mechanical output, the output shaft 8 being supported by a bearing 9.

The flow rate control section 2 includes a pair of conical flow rate control valves 13 and 14 which are so mounted on the output shaft 8 as to respectively oppose valve seat portions 11 and 12 which are provided on a flow path 10 in which the flow rate is controlled. The output shaft 8 and the valves 13 and 14 may be made of a metal material or a resin material. As the output shaft 8 is moved, the cross-sectional area of the flow path is varied. A projective free end of the output shaft 8 can slide within a tubular projection of a guide lid 15. A first or bias spring 17 is disposed between the guide lid 15 and the flow rate control valve 14. A body 16 made of a non-magnetic metal, defining the flow control path 10 along with the guide lid 15, is secured at its lefthand end to the casing 7. Thrusts of the flow streams passing through apertures of the valve seat portions 11 and 12, which act on the flow rate control valves 13 and 14, can be cancelled since these streams are opposite to each other as shown by arrows.

In the case where there is provided only one flow rate control valve, if the magnitude of the negative pressure applied to the exit side of the control path varies, the respective pressure values at the forward and backward side of the flow rate valve become different so that the flow rate varies even if the current is kept constant. On the contrary, according to the embodiment of the present invention, since two flow rate control valves are used, the respective negative pressures applied to these two flow rate control valves are cancelled by each other so that the controlled flow rate is not affected by the negative pressure variations. Accordingly, in any status of the negative pressure, the proportional relationship between the stroke of the flow rate control valve and the value of current applied to the electromagnetic driving section can be maintained.

A second spring 20 is received in a cavity 21 provided in the lefthand end of the movable core 5. The second spring 20 is a compressed spring which impresses its spring force on the output shaft 8 in the direction of arrow 19 so as to cope with the spring force of the bias spring 17 acting in the direction of arrow 18.

With this construction, when a given amount of current is fed to the coil 3, the movable core 5 is impressed with electromagnetic force which is proportional to the current and is then moved in the direction of arrow 19 in opposition to the spring force of the bias spring 17 to thereby open the flow rate control valves 13 and 14 until it is stopped as the result of a balance among the electromagnetic force and the respective force of the bias spring 17 and the second spring 20. When the amount of current fed to the coil 3 is increased to more than the given value, the movable core 5 moves further toward the stationary core 4. Then, if the current is cut off, the movable core 5 is returned in the direction of arrow 18 by means of the bias spring 17 so that the flow rate control valves 13 and 14 engage the valve seat portions 11 and 12 to seal there, respectively.

Figure 2:
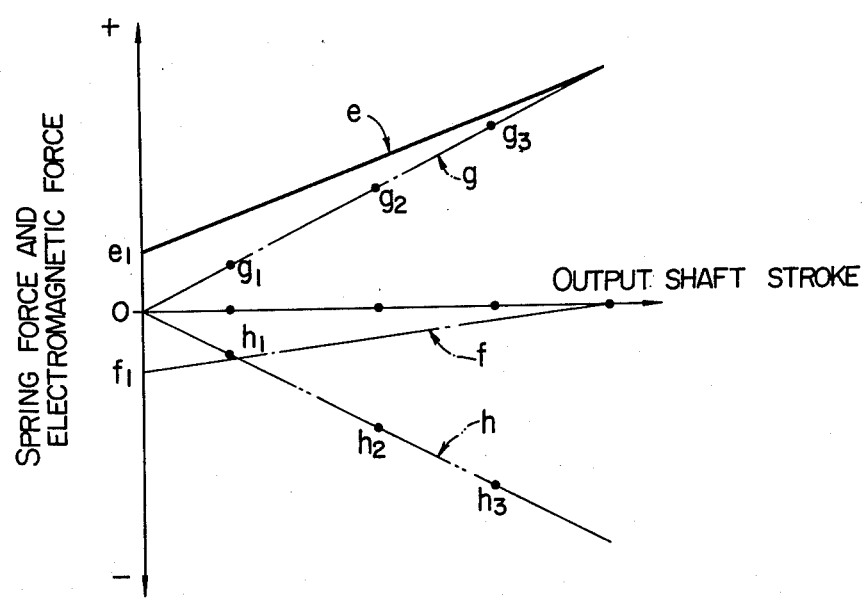
FIG. 2 is a graphic representation to show the relation between the output shaft stroke of the proportional type electromagnetic valve shown in FIG. 1 and the spring force and electromagnetic force.

Dynamics in the above operation will be best understood with reference to FIG. 2.

FIG. 2 shows the relation between the stroke of the output shaft of the proportional type electromagnetic valve as shown in FIG. 1 versus the spring force and electromagnetic force, where the horizontal axis represents the stroke of the output shaft and the vertical axis represents the electromagnetic force produced in the electromagnetic driving section 1 in the negative direction, the spring force of the bias spring 17 in the positive direction, and the spring force of spring 20 in the negative direction. A straight line e representative of the characteristic of the bias spring 17 has a gradient indicative of the spring constant and an initial value $e_1$ indicative of the set load. Similarly, a straight line f representative of the characteristic of the second spring 20 has a gradient indicative of the spring constant which is smaller than that of the bias spring 17 and an initial value $f_1$ indicative of the set load which is identical with $e_1$ in magnitude but is opposite thereto in polarity. A straight line g representative of the resultant characteristic of the bias spring 17 and second spring 20 has an initial value of zero because of equality of the absolute values of the set loads $e_1$ and $f_1$, ensuring that the output shaft 8 can start to move with a set load of zero. Obviously, the straight line g representative of the resultant characteristic of the two springs traces the sum of spring force of both the springs at instantaneous strokes and has a gradient indicative of the spring constant of an imaginary composite spring. The relation between the stroke of the output shaft 8 and the electromagnetic force is denoted by a straight line h, indicating that the output shaft 8 can start to move from the original point at which the electromagnetic force is zero.

According to experiments of the inventors, the second spring 20 preferably has a spring constant which is ½ to 1/10 times that of the bias spring 17, most preferably, 1/5. Within this range, the trouble encountered in the prior art proportional type electromagnetic valve may be prevented wherein the flow rate control valve fails to close or does not start to open before the current reaches a relatively large value. This also permits the electromagnetic driving section 1 to be reduced in its size.

It is essential in the present invention to keep the proportional relation between the displacement of the flow rate control valves 13 and 14 and the amount of the current being fed to the coil 3. The proportionality may be further improved by defining the configuration of the flow rate control valves in accordance with teaching set forth below.

Where the conical flow rate control valves 13 and 14 mate with circular apertures of the respective valve seat portions 11 and 12 as described above, the area of an annular gap between the valve seat portion and the flow rate control valve cannot vary linearly, thus degrading the proportionality. The following is a solution to this problem.

Figure 3:
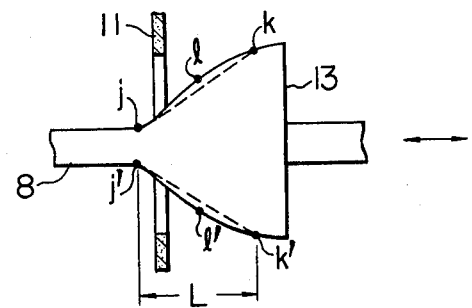
FIG. 3 is a diagram to show an example of preferred configuration of a flow rate control valve incorporated in the valve of FIG. 1.

FIG. 3 shows an improved configuration of the flow rate control valves 13 and 14 incorporated in the valve shown in FIG. 1. When assuming that the aperture diameter of the valve seat portion 11 is equal to the diameter, dimensioned as $\overline{kk'}$, of the flow rate control valve 13, the diameter of the output shaft 8 is dimensioned as $\overline{jj'}$, and the distance of movement of the flow rate control valve 13 is dimensioned as L, it is possible to make the stroke of the output shaft 8 proportional to the crosssectional area of the annular flow path by warping a portion of the conical surface of the flow rate control valve 13 confined in a distance $\overline{jk}$ such that the contour of a section of the portion lies on a quadratic curve. Thus, the solid curve j-l-k defines the warped conical surface. For simplicity of working the surface, the curve j-l-k may be replaced by two segments of straight lines $\overline{jl}$ and $\overline{lk}$, attaining approximate effects.

As described above, in the proportional type electromagnetic valve according to the invention, the second spring of relatively weak spring force is disposed at one end, opposite to the output shaft, of the movable core and the conical surface of the flow rate control valve is warped so that the flow rate can be controlled in exact proportion to the current fed to the electromagnetic driving section.

Figure 4:
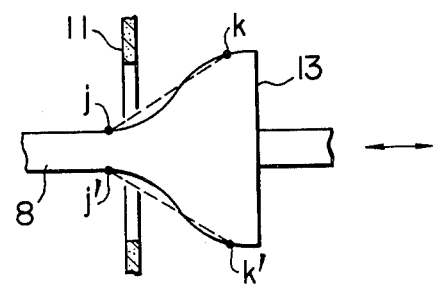
FIG. 4 is a diagram to show a modification of FIG. 3.

The configuration of the flow rate control valves 13 and 14 shown in FIG. 3 may be modified as shown in FIG. 4 in which like parts are designated by like characters. In this modification, warping of the conical surface of the flow rate control valve 13 is experimentally determined to further improve the proportionality between the stroke of the output shaft 8 and the current fed to the electromagnetic driving section 1. Thus, segment j-k is undulated wherein a portion of the flow rate control valve close to the output shaft 8 is warped to more extent than the remaining portion to thereby correct a decrease in the controlled flow rate which would occur as the stroke of the output shaft 8 grows large.

In this manner, the controlled flow rate in the proportional type electromagnetic valve can be corrected by warping the conical surface of the flow rate control valve for the purpose of improving the proportionality between the stroke of the output shaft 8 and the controlled flow rate. If desired, however, the proportionality may intentionally be disturbed by adjusting the configuration of the flow rate control valve such that the controlled flow rate is locally increased or decreased at a specified position or stroke of the movement of the output shaft 8 in order to improve operational performance of automobiles or purification of an exhaust gas. The proportional type electromagnetic control valve was described as applied to air controlling in the exhaust gas purifying system but it is not limited to such an application and may be applicable to flow rate controlling of liquid fuel and the like.

As having been described, the invention may advantageously achieve the proportional type control valve which ensures the proportionality between the input current and the controlled flow rate.

What we claim is:

1. A proportional type electromagnetic valve for controlling flow rate of fluid comprising, electromagnetic driving means having axially movable output shaft means whose moving stroke is in proportion to an input current fed to the electromagnetic driving means, a plurality of valve means mounted on the output shaft means for controlling flow rate of fluid in proportion to the stroke of the output shaft means, a first spring means biasing the output shaft means in a direction opposite to a direction of force applied to the output shaft means by the electromagnetic driving means, and a second spring means biasing said output shaft means in the same direction as the direction of force applied to said output shaft means by said electromagnetic driving means, each of said first and second spring means having a linear force-displacement characteristic such that the sum of the spring forces of said first and second spring means biasing said output shaft means is in linear proportion to the stroke of said output shaft means.

2. A proportional type electromagnetic valve according to claim 1, wherein said second spring means is a coiled spring having a spring constant which is ½ to 1/10 times that of said bias spring.

3. A proportional type electromagnetic valve according to claim 1, wherein each of said flow rate control valve means has a configuration in section taken on line of the stroke having a contour at least a portion of which lies on a quadratic curve.

4. A proportional type electromagnetic valve according to claim 1, wherein each of said plurality of valve means has a surface which opposes one of a plurality of valve seat portions provided in a path for the fluid to be controlled.

5. A proportional type electromagnetic valve according to claim 4, wherein the surface of each valve means which opposes a valve seat portion is conical.

6. A proportional type electromagnetic valve according to claim 4 or 5, wherein a first one of said plurality of valve means and its opposing valve seat portion are positioned in said path such that the flow stream of fluid which passes said first valve means is in a first direction, and wherein a second valve means of said plurality of valve means and its opposing valve seat portion are positioned in said path such that the flow stream of fluid which passes said second valve means is in a direction opposite that of said first direction whereby the thrusts of the flow streams passing said first and second valve means oppose each other.

* * * * *